US008137039B2

(12) United States Patent
Liang et al.

(10) Patent No.: US 8,137,039 B2
(45) Date of Patent: Mar. 20, 2012

(54) CONNECTING FITTING

(75) Inventors: Hsiu-Chiang Liang, Kaohsiung Hsien (TW); Ken-Ching Chen, Kaohsiung Hsien (TW); Chun-Chiang Wang, Kaohsiung Hsien (TW)

(73) Assignee: King Slide Works Co., Ltd., Kaohsiung Hsien (TW)

( * ) Notice: Subject to any disclaimer, the term of this patent is extended or adjusted under 35 U.S.C. 154(b) by 156 days.

(21) Appl. No.: 12/536,871

(22) Filed: Aug. 6, 2009

(65) Prior Publication Data

US 2011/0030172 A1 Feb. 10, 2011

(51) Int. Cl.
*F16B 13/04* (2006.01)

(52) U.S. Cl. .......................................... 411/34; 292/257

(58) Field of Classification Search .................... 411/37, 411/38, 34; 292/257; 24/453; 403/DIG. 12
See application file for complete search history.

(56) References Cited

U.S. PATENT DOCUMENTS 3,982,656 A * 9/1976 Kusmierski et al. .......... 220/238
4,083,468 A * 4/1978 Batchelor ..................... 220/234
4,085,481 A 4/1978 Lautenschlager
4,188,685 A 2/1980 Rock et al.
4,862,556 A 9/1989 Grass
4,982,476 A 1/1991 Salice
5,246,322 A 9/1993 Salice
5,468,109 A 11/1995 Ferrari et al.
5,561,888 A 10/1996 Lautenschlager
5,586,364 A 12/1996 Ferrari et al.
5,607,271 A 3/1997 Salice
5,611,637 A 3/1997 Brustle et al.
5,626,450 A 5/1997 Ferrari et al.
5,669,108 A 9/1997 Ferrari et al.
5,725,342 A 3/1998 Gehrer
5,895,103 A * 4/1999 Huber ........................ 312/348.4
5,966,779 A 10/1999 Salice
6,106,185 A * 8/2000 Isele et al. ..................... 403/297
6,200,081 B1 * 3/2001 Ferrari et al. ................... 411/80
6,361,241 B1 * 3/2002 Ferrari et al. ................. 403/297
6,659,513 B1 * 12/2003 Ramsauer ........................ 292/66
6,975,317 B2 * 12/2005 Shehane et al. ............... 345/421

* cited by examiner

*Primary Examiner* — Gary Estremsky
(74) *Attorney, Agent, or Firm* — Rosenberg, Klein & Lee

(57) ABSTRACT

A connecting fitting includes a body having a cam surface and an inserting assembly which is pivotally connected with the body. The inserting assembly includes an inserting member and at least one expandable member mounted between the body and the inserting member. The expandable member includes an expandable portion and a lip portion extending from the expandable portion. A compressible space is defined by the expandable portion and the lip portion, and the expandable portion has a plurality of snap portions. When the body is axially turned relative to the inserting assembly at a certain angle to generate a push force, the snap portions will be expanded outwardly by the push force.

10 Claims, 11 Drawing Sheets

CONNECTING FITTING

BACKGROUND OF THE INVENTION

1. Field of the Invention

This invention relates to a connecting fitting, and more particularly to a connecting fitting for furniture installation, which is able to be used repeatedly.

2. Description of the Prior Art

Connecting fittings can be used for furniture connection. Such techniques have been disclosed, such as U.S. Pat. No. 5,611,637, titled "Furniture Fitting", which comprises at least one dowel 6 to be inserted into a hole 22 in one furniture part, an expansion member 10 disposed in the dowel 6, and a holding member 8 connected to another furniture part. The expansion member 10 has an expansion surface and is movable relative to the dowel 6 between a relaxed position, enabling the dowel 6 to be inserted into the hole 22, and an expanded position. The holding member 8 is connected to an end of the expansion member 10 with a shaft for pivotal movement about the shaft. The holding member 8 has a cam surface 9 which is adapted to abut against a surface of the dowel 6, such that pivotal movement of the holding member 8 causes the cam surface 9 to abut against the surface of the dowel 6, and the holding member 8 drives the expansion member 10 to move axially. With the expansion surface to expand the dowel 6, the dowel 6 is able to be secured in the hole 22.

The dowel 6 is substantially formed with plural teeth around its surface. The inner surface of the hole 22 of the furniture part can be bit by the dowel 6 when the dowel 6 is inserted into the hole 22 and the holding member 8 is turned for the expansion member 10 to expand the dowel 6. However, once the holding member 8 is released, the expansion member 10 will return to its original position, so that the dowel 6 will be released and the teeth will be disengaged from the inner surface of the hole 22. When the teeth engage with or disengage from the inner surface of the hole 22, it will leave marks at the same positions each time. After many times of usage, the marks will influence the retaining effect of the conventional connecting fitting.

SUMMARY OF THE INVENTION

This invention relates to a connecting fitting for quick assembly of furniture, which can be used repeatedly.

According to one aspect of the present invention, there is provided a connecting fitting, comprising:

a body having a cam surface thereon;

an inserting assembly pivotally connected to the body, the inserting assembly comprising an inserting member, at least one expandable member, and a plug;

the inserting member comprising a head portion and a body portion extending from the head portion, the body portion being pivotally connected to the body;

the expandable member mounted between the body and the head portion of the inserting member, the expandable member comprising an expandable portion and a lip portion extending from the expandable portion, the expandable portion and the lip portion defining a compressible space therein, and the expandable portion comprising a plurality of notches and snap portions; and the plug fitted on the body portion of the inserting member and located between the expandable member and the body, the expandable portion being urged by a push force from the cam surface of the body and the plug to hold against the head portion of the inserting member and to expand the snap portions outwardly.

Preferably, the body comprises a pair of lugs spaced from each other, a slot formed between the pair of lugs, and a connecting hole penetrating through the pair of lugs, the pair of lugs each having a first surface and a second surface, and the cam surface of the body being connected between the first and second surfaces.

Preferably, the body comprises a connecting portion for connecting with an object.

Preferably, the body comprises a handle for operating the body.

Preferably, the body comprises a connecting portion, a pair of lugs spaced from each other, a base disposed between the pair of lugs, and a pair of slots each formed between the base and one of the pair of lugs, and the inserting assembly being pivotally connected to each of the pair of slots.

DETAILED DESCRIPTION OF THE PREFERRED EMBODIMENTS

Figure 1:
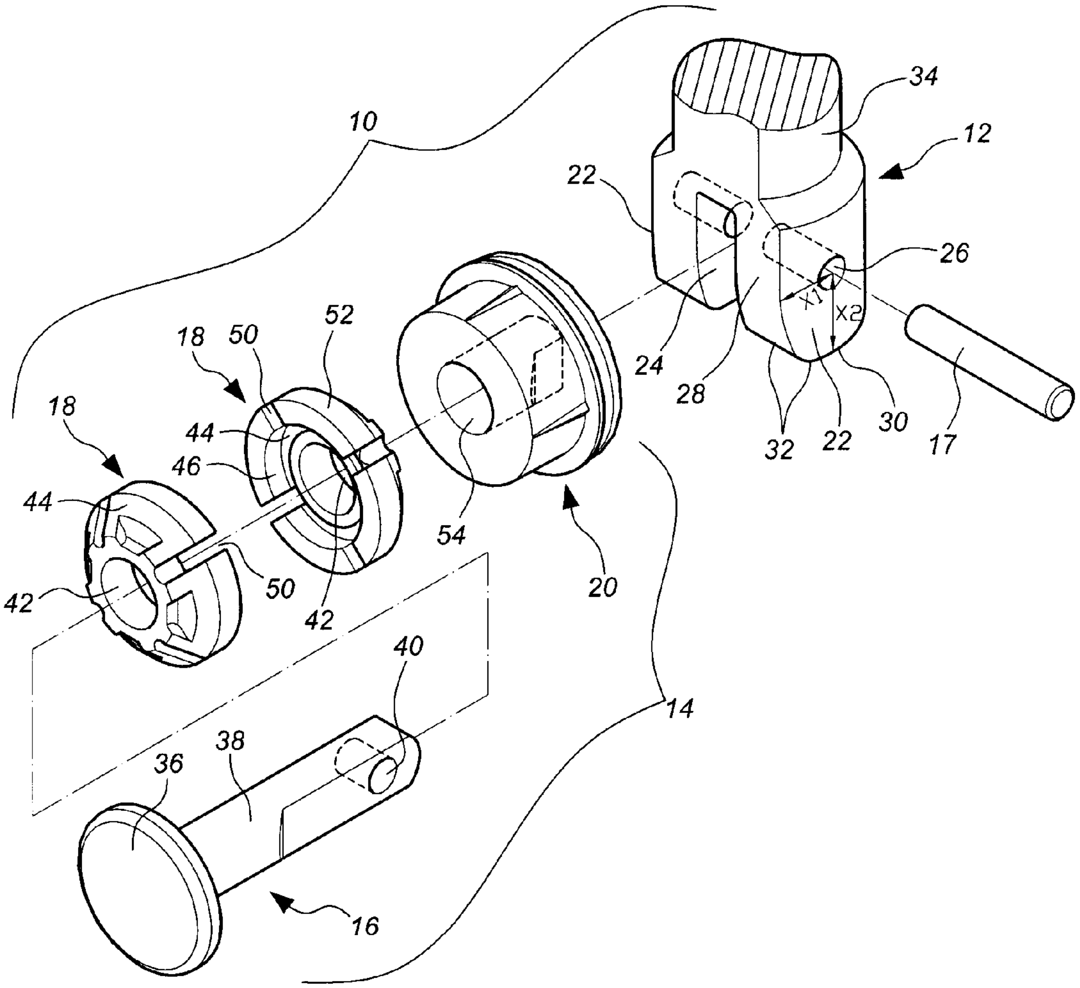
FIG. 1 is an exploded view of a connecting fitting according to a first preferred embodiment of the present invention.
Figure 2:
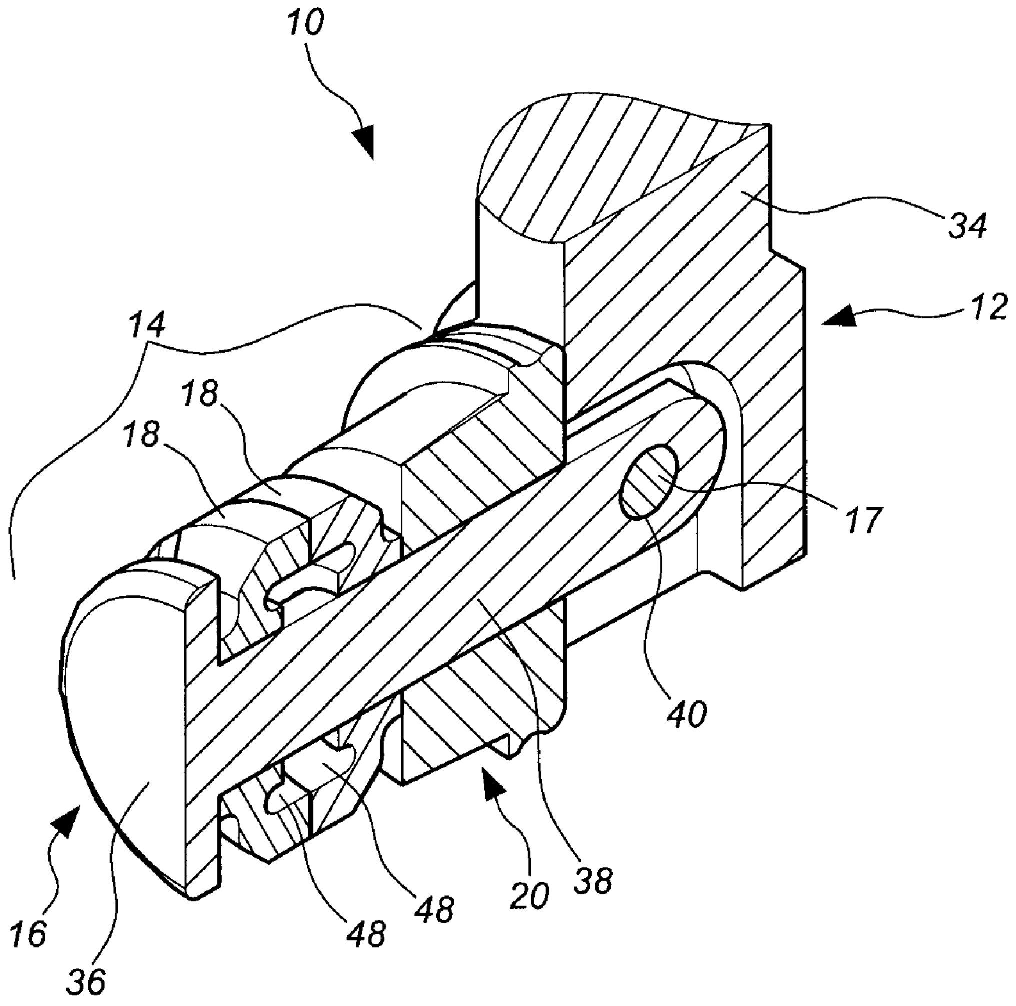
FIG. 2 is an assembled cross-sectional view of the connecting fitting according to the first preferred embodiment of the present invention.

FIGS. 1 and 2 show a connecting fitting 10 of a first preferred embodiment of the present invention comprises a body 12 and an inserting assembly 14 connected with the body 12. The inserting assembly 14 comprises an inserting member 16 which is pivotally connected to the body 12 with a connecting member 17, a pair of expandable members 18, and a plug 20 mounted between the body 12 and the inserting member 16.

The body 12 comprises a pair of lugs 22 spaced from each other, a slot 24 formed between the pair of lugs 22, and a connecting hole 26 penetrating through the pair of lugs 22.

Each of the lugs 22 has a first surface 28 and a second surface 30 extending from the first surface 28. The second surface 30 is substantially perpendicular to the first surface 28. The distance from the center of the connecting hole 26 to the first surface 28, defined as X1, is different from the distance from the center of the connecting hole 26 to the second surface 30, defined as X2. Preferably, the body 12 further has a cam surface 32 connected between the first and the second surfaces 28, 30. The body 12 further comprises a connecting portion 34 for a user to operate the body 12 or to connect with an object.

The inserting member 16 comprises a head portion 36 and a body portion 38 extending from the head portion 36. The body portion 38 is formed with a through hole 40. By inserting the connecting member 17 through the through hole 40 and the connecting hole 26, the inserting member 16 is pivotally connected with the body 12.

Each expandable member 18 comprises a mounting hole 42 for insertion of the body portion 38 of the inserting member 16, an expandable portion 44 extending from the mounting hole 42 outwardly, and a lip portion 46 axially extending from one end of the expandable portion 44. The expandable portion 44 and the lip portion 46 define a compressible space 48 therein. The expandable portion 44 comprises a plurality of notches 50 and snap portions 52. In this embodiment, the pair of expandable members 18 is made of flexible material.

The plug 20 is formed with a through hole 54 for insertion of the body portion 38 of the inserting member 16, and is located between the body 12 and the pair of expandable members 18.

Figure 3:
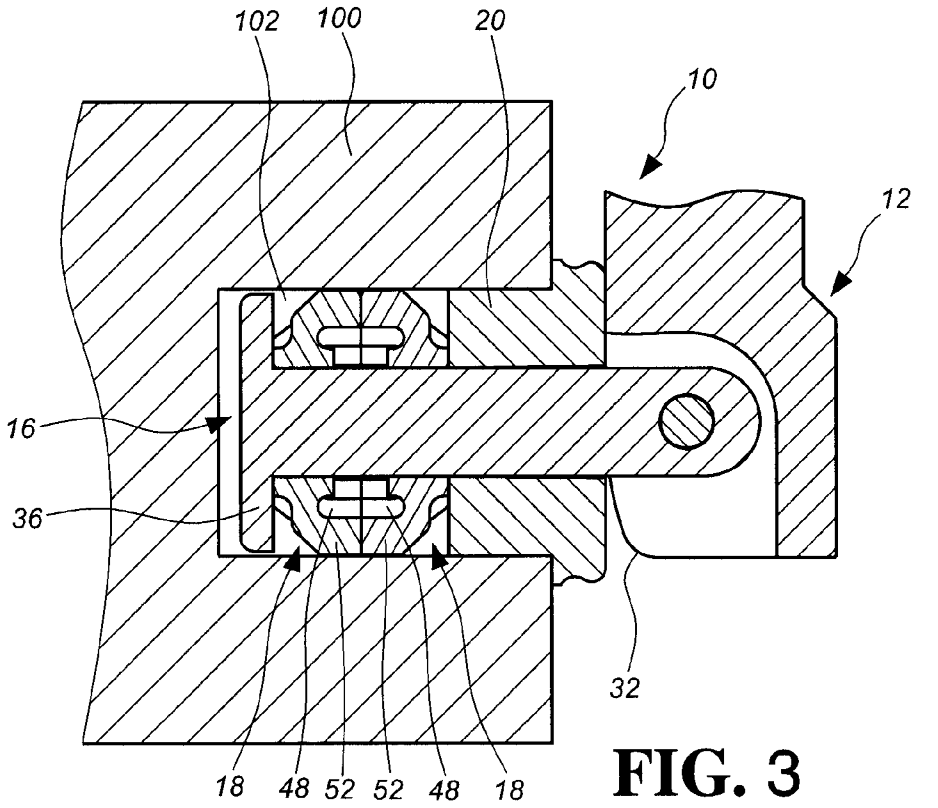
FIG. 3 is a cross-sectional view showing the connecting fitting inserted into an object according to the first preferred embodiment of the present invention.

FIG. 3 shows a cross-sectional view of a connection between the connecting fitting 10 and an object 100 according to the first preferred embodiment of the present invention. The object 100 has an installation hole 102. The inserting member 16 is pivotally connected to the body 12. The pair of expandable members 18 and the plug 20 are mounted between the body 12 and the inserting member 16. All the inserting member 16, the pair of expandable members 18 and the plug 20 are inserted in the installation hole 102 of the object 100. The cam surface 32 of the body 12 is adjacent to the plug 20.

Figure 4:
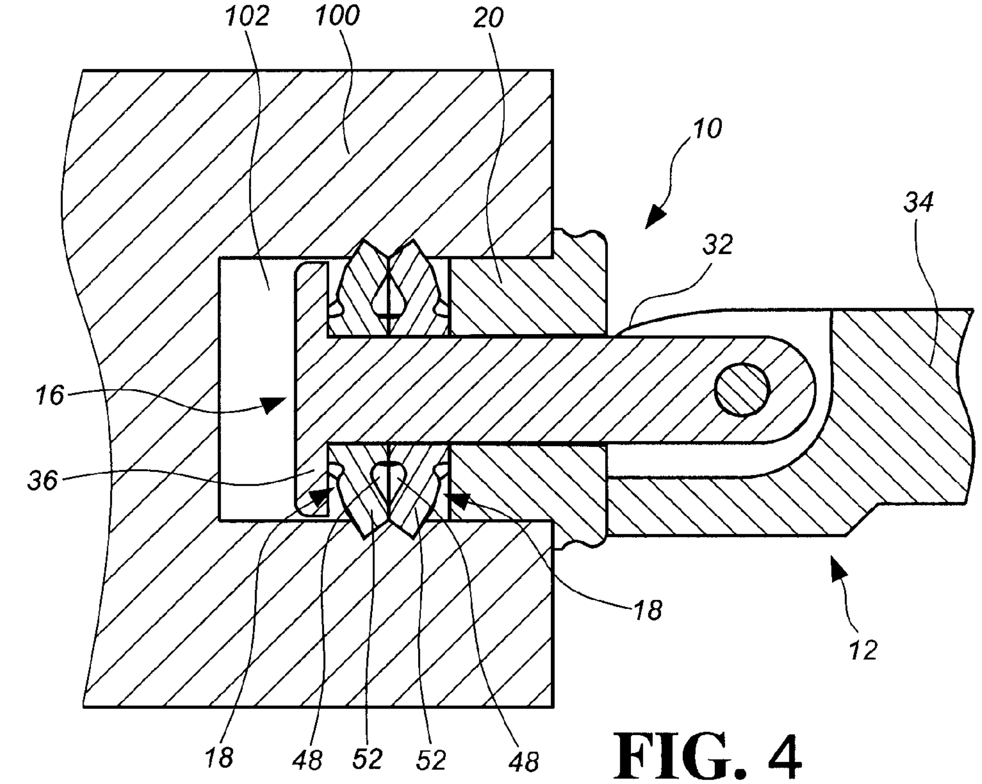
FIG. 4 is a cross-sectional view showing the connecting fitting securely connected to the object according to the first preferred embodiment of the present invention.

FIG. 4 is a cross-sectional view of the connecting fitting 10 and the object 100 in an operated status according to the first preferred embodiment of the present invention. When the connecting portion 34 of the body 12 is turned to an angle by a user, the cam surface 32 of the body 12 will lean against the plug 20 to pull the inserting member 16, and then the head portion 36 of the inserting member 16 will squeeze the pair of expandable members 18 towards the plug 20. Thus, the snap portions 52 of the pair of expandable members 18 will be expanded outwardly to mesh with the inner wall of the installation hole 102 of the object 100.

Figure 5:
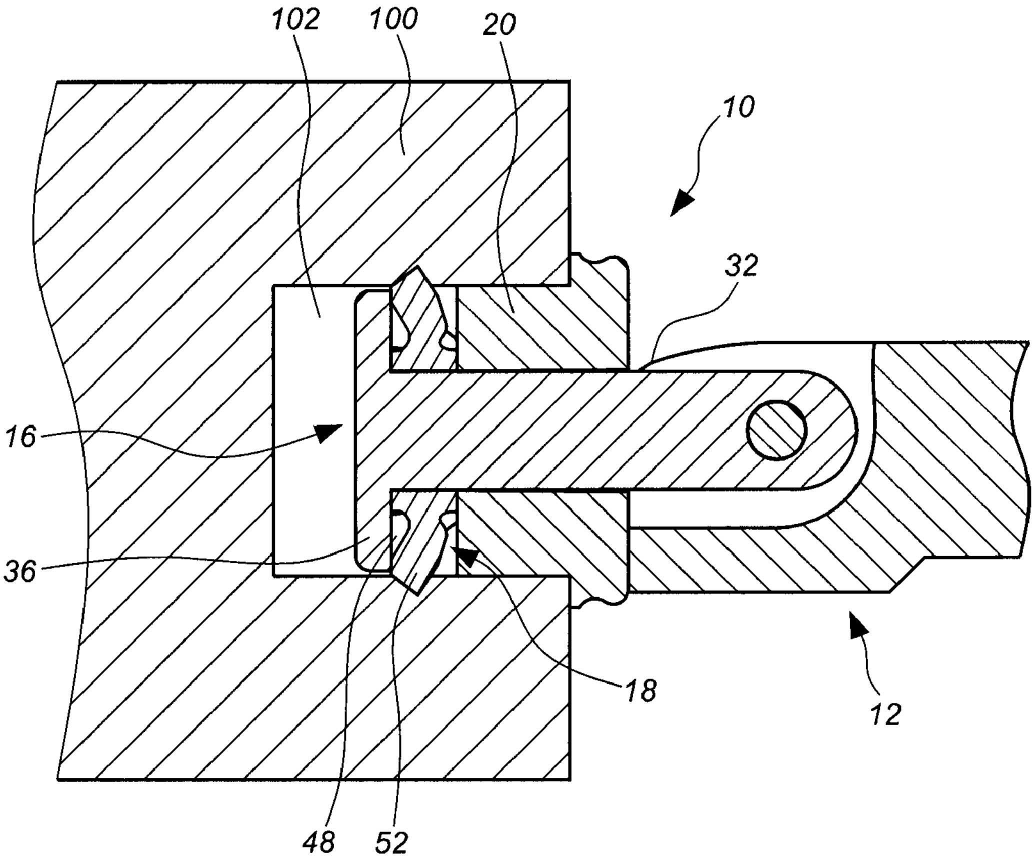
FIG. 5 is a cross-sectional view showing the connecting fitting with an expandable member securely connected to the object according to the first preferred embodiment of the present invention.

FIG. 5 is a cross-sectional view showing only one expandable member 18 mounted in the installation hole 102 of the object 100. The expandable member 18 comprises the mounting hole 42, the expandable portion 44, the lip portion 46, and the compressible space 48 defined by the expandable portion 44 and the lip portion 46. The expandable portion 44 comprises the plurality of notches 50 and snap portions 52. With the snap potions 52 to mesh with the inner wall of the installation hole 102, the expandable member 18 also can be secured in the object 100.

Figure 6:
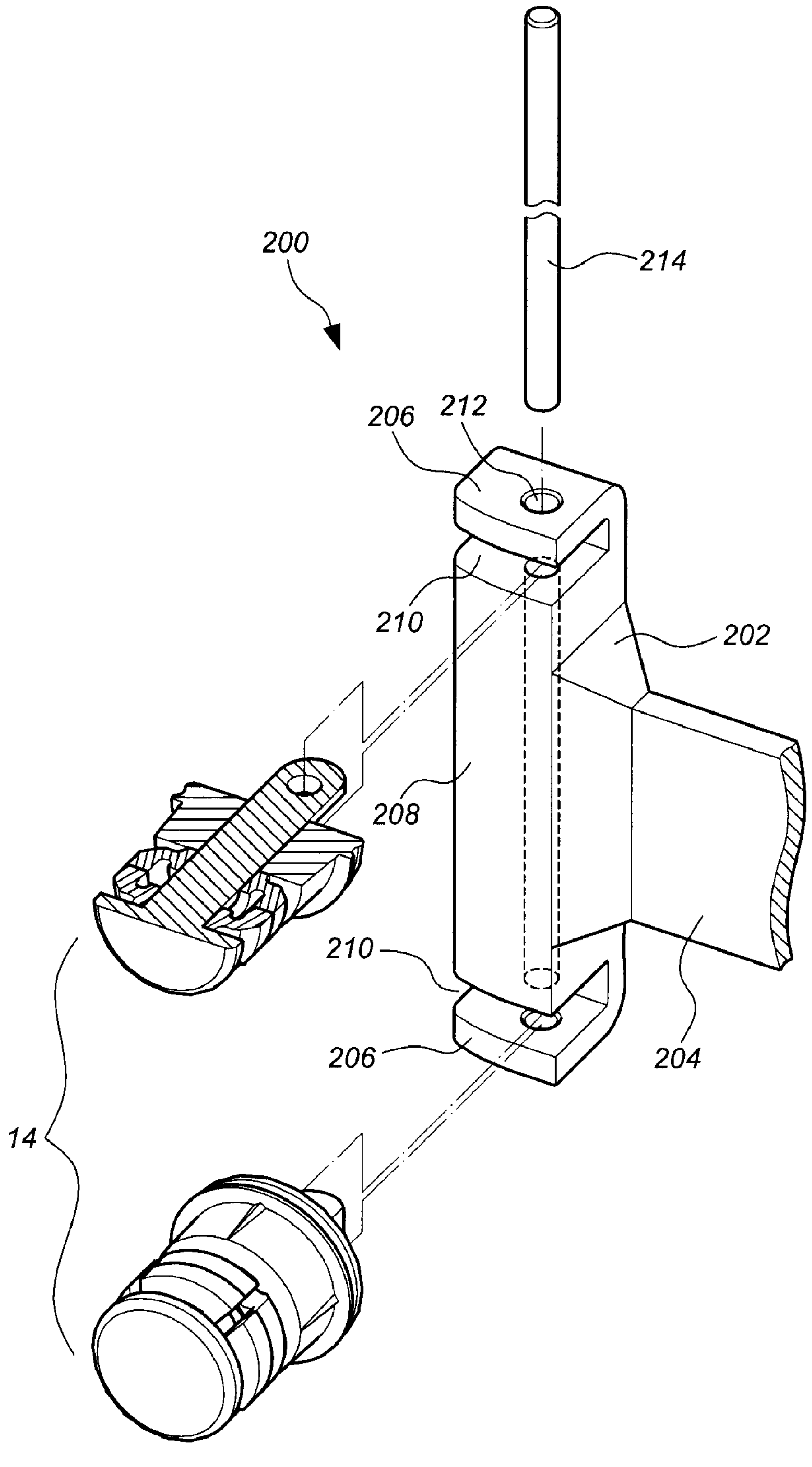
FIG. 6 is an exploded view of a connecting fitting according to a second preferred embodiment of the present invention.
Figure 7:
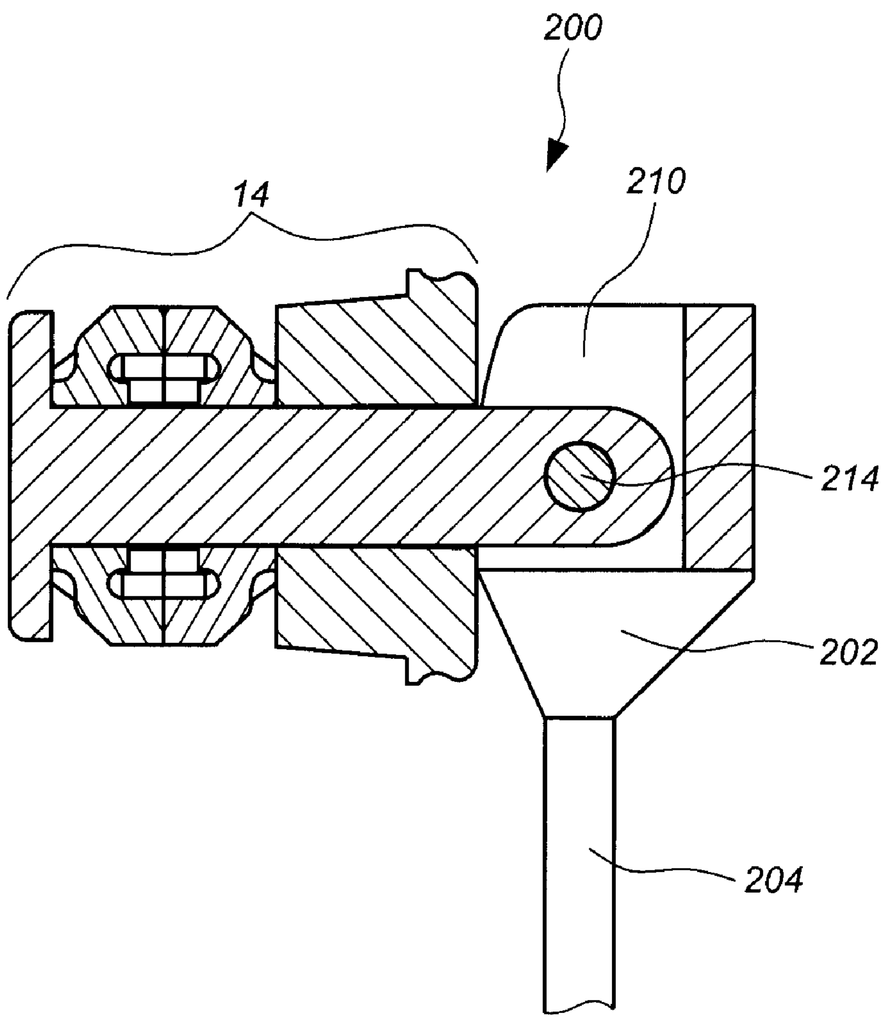
FIG. 7 is an assembled cross-sectional view of the connecting fitting according to the second preferred embodiment of the present invention.

Referring to FIGS. 6 and 7, a connecting fitting 200 according to a second preferred embodiment of the present invention comprises a body 202 and a pair of inserting assemblies 14. The body 202 comprises a connecting portion 204, a pair of lugs 206 spaced from each other, a base 208 disposed between the pair of lugs 206 and integrally formed with the body 202, a pair of slots 210 each formed between the base 208 and one of the pair of lugs 206, and a connecting hole 212. The connection hole 212 penetrates through the pair of lugs 206 and the base 208. The pair of inserting assemblies 14 are pivotally connected to the pair of slots 210 of the body 202 with a connecting member 214. Thus, the connecting fitting 200 could have the plurality of inserting assemblies 14.

Figure 8:
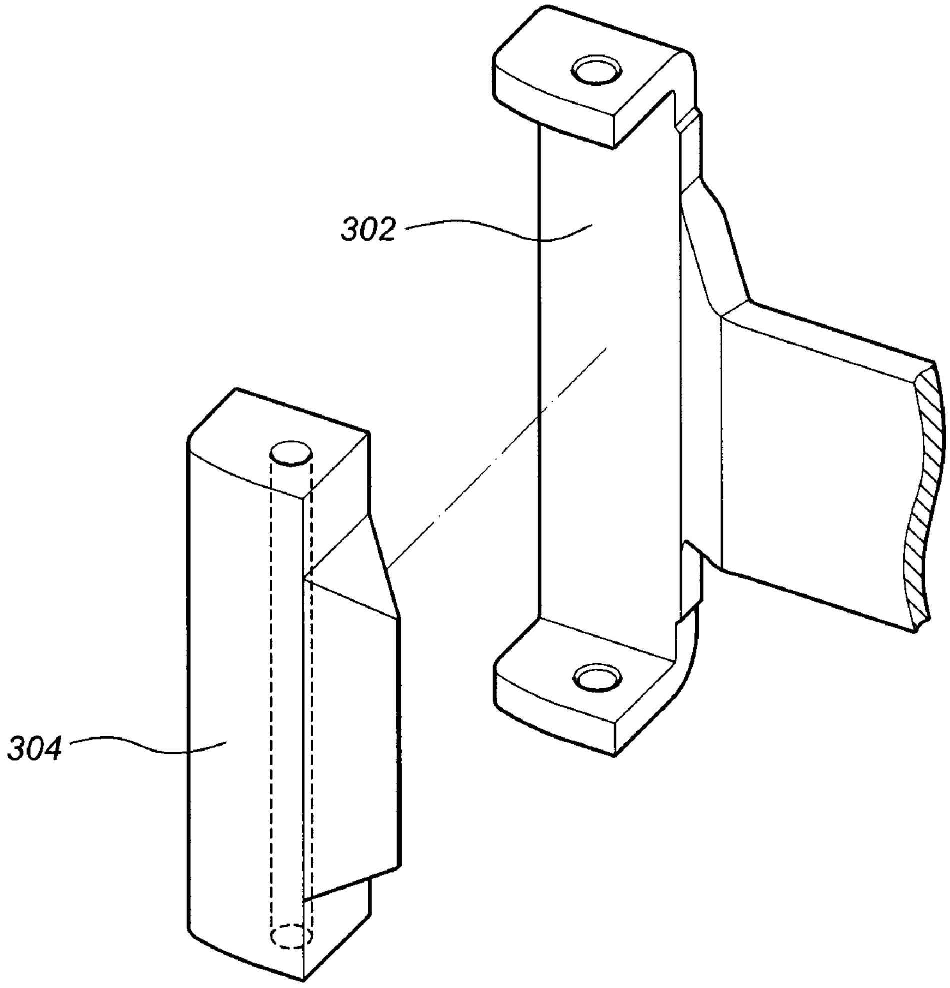
FIG. 8 is an exploded view of a connecting fitting according to a third preferred embodiment of the present invention.

FIG. 8 shows a third preferred embodiment of the present invention, which is substantially similar to the second preferred embodiment with the exceptions described hereinafter. The body is divided into two separate portions, a main body 302 and a middle base 304 which is separated from the body 302.

Figure 9:
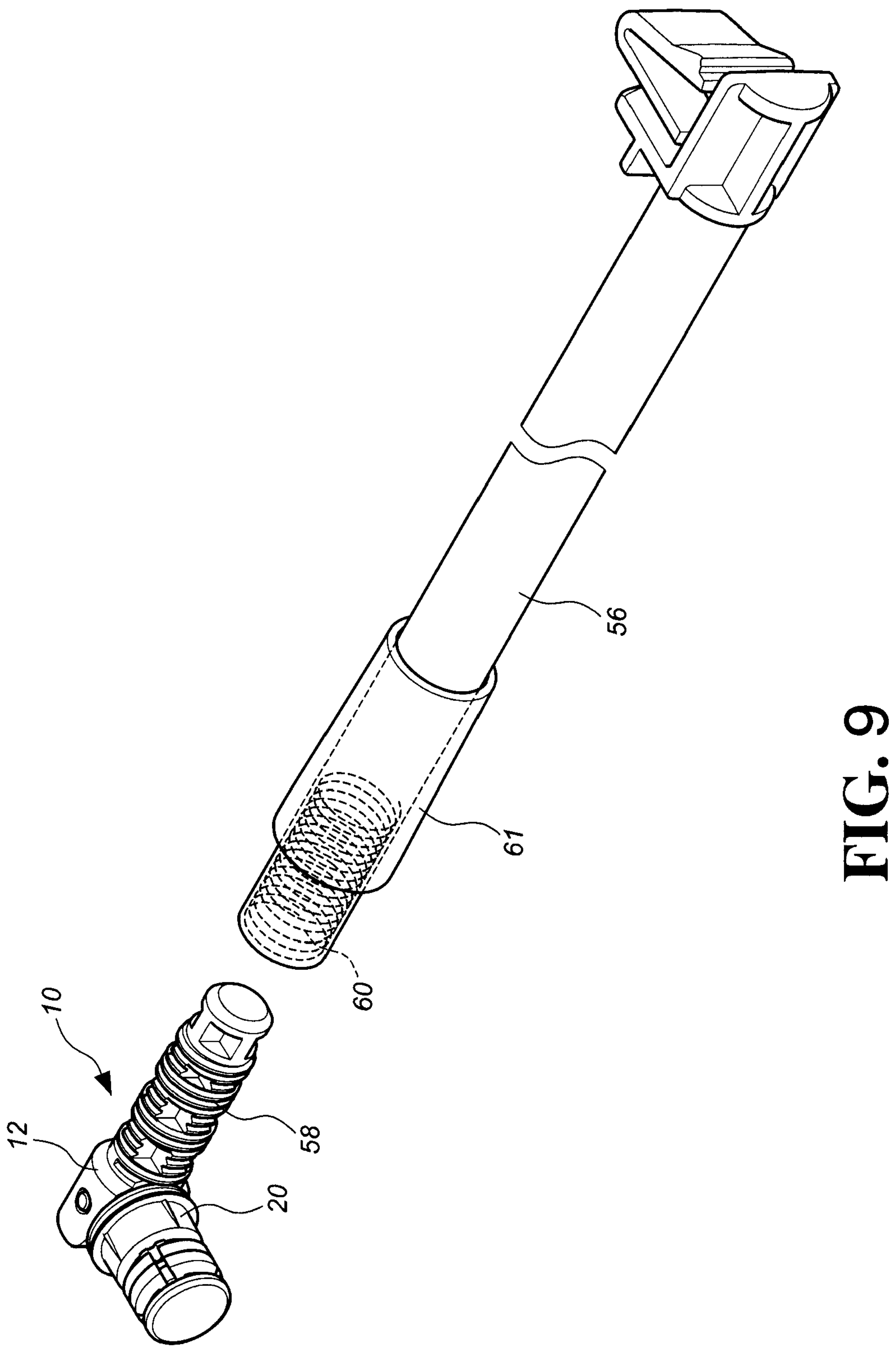
FIG. 9 is a perspective view of the present invention showing the connecting fitting to be connected with a tubal object.

FIG. 9 is a schematic view of the connecting fitting 10 of the present invention in conjunction with a tubal object 56. The body 12 of the connecting fitting 10 has a spiral connecting portion 58. The tubal object 56 has a coupling portion 60. The coupling portion 60 is formed with a threaded hole therein for connecting with the spiral connecting portion 58 of the body 12. Furthermore, a sleeve 61 is provided at the junction of the tubal object 56 and the body 12. When the body 12 is turned to an angle with respect to the tubal object 56, the sleeve 61 will be fitted on the plug 20, as shown in FIG. 11.

Figure 10:
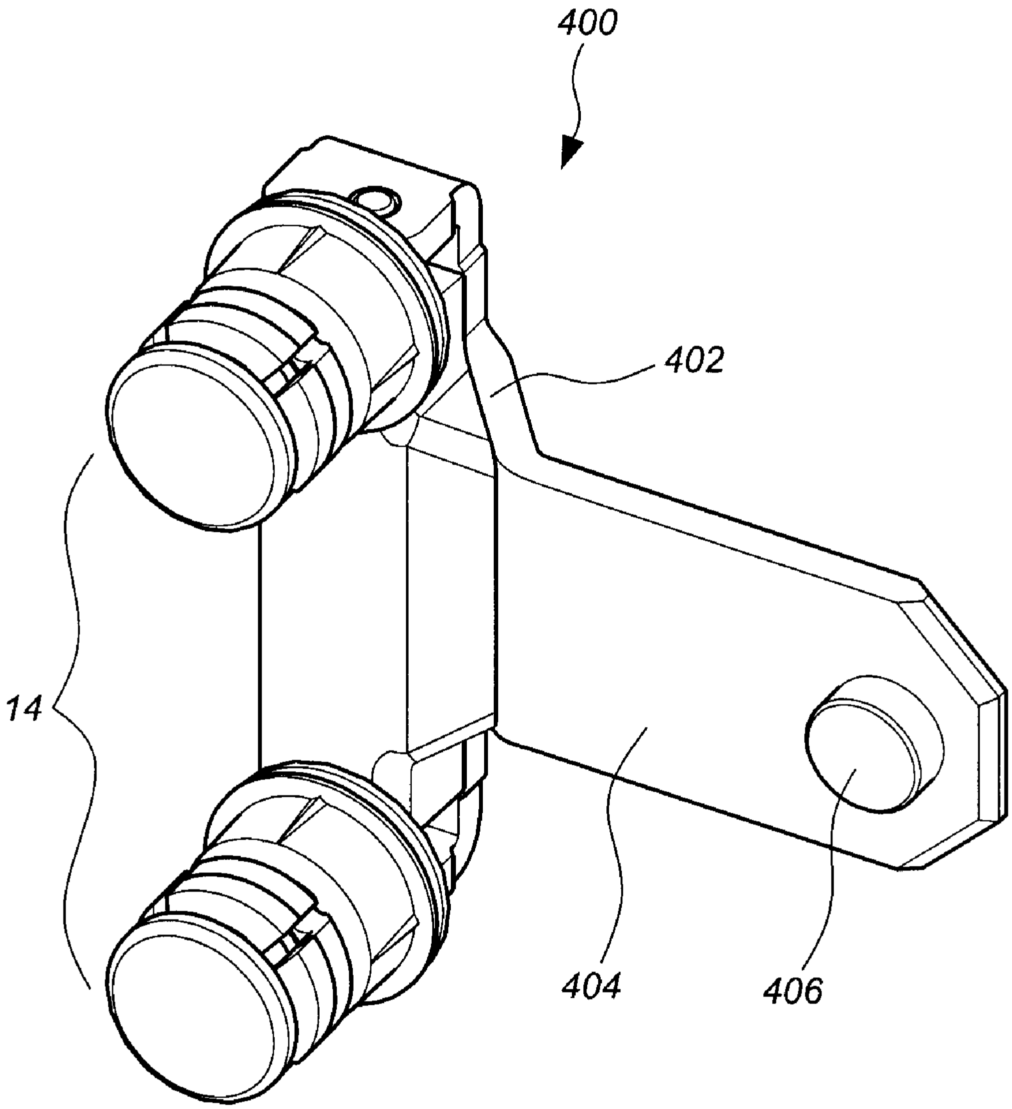
FIG. 10 is a perspective view of a connecting fitting according to a fourth preferred embodiment of the present invention.

As shown in FIG. 10, a connecting fitting 400 according to a fourth preferred embodiment of the present invention comprises a body 402 and a pair of inserting assemblies 14 which are pivotally connected to two opposite ends of the body 402. The body 402 has a connecting portion 404 and a stud 406 on the connecting portion 404.

Figure 11:
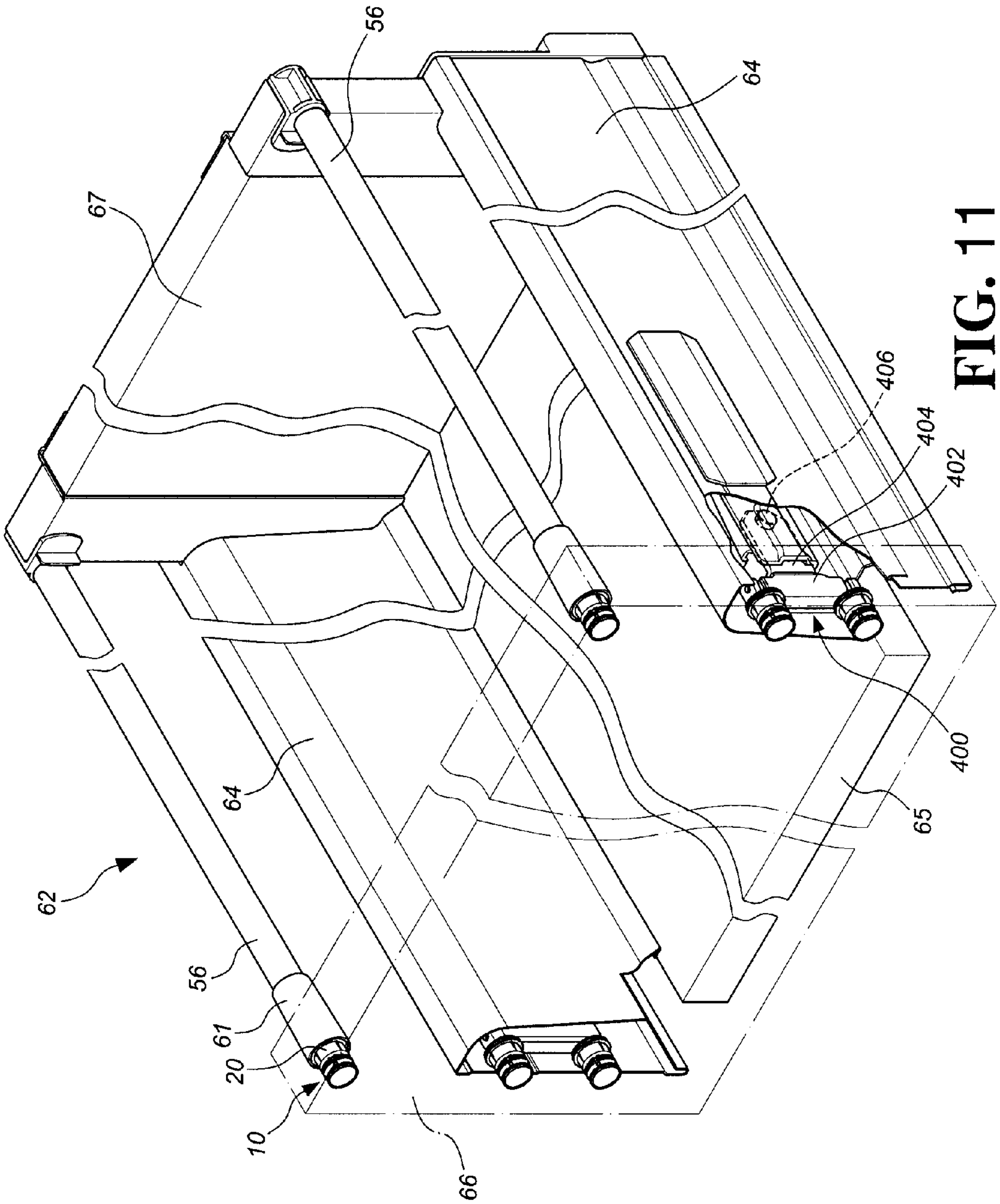
FIG. 11 is a perspective view of the present invention showing the connecting fitting applied to a drawer assembly.

FIG. 11 is a schematic view showing the connecting fitting of the present invention adapted to connect with two objects. For instance, it can be adapted to connect with two objects of a drawer assembly 62. The drawer assembly 62 comprises a pair of side frames 64, a bottom board 65, a front panel 66 and a rear board 67 to form a complete drawer space. A pair of tubal objects 56 is provided at an upper end of the drawer assembly 62. The pair of side frames 64 and the front panel 66 are referred to as a first object and a second object, respectively, and can be connected by the connecting fitting 400. The pair of inserting assemblies 14 of the connecting fitting 400 is connected to the front panel 66. By turning the connecting portion 404 of the body 402 to an angle, the body 402 is turned to an angle with respect to the connecting portion 404 for the stud 406 to engage with the side frame 64. With the connecting fitting 400, the side frames 64 and the front panel 66 can be secured firmly. Furthermore, the tubal objects 56 and the front panel 66 can also be referred to as the first object and the second object, respectively, as shown in FIG. 9. By connecting the coupling portion 60 of the tubal object 56 with the spiral connecting portion 58, the inserting assembly 14 is inserted into an installation hole of the front panel 66 by turning the tubal object 56 to an angle. The snap portions 52 of the expandable member 18 will be expanded to mesh with the inner wall of the installation hole of the front panel 66 for securing the tubal object 56 to the front panel 66.

Figure 12:
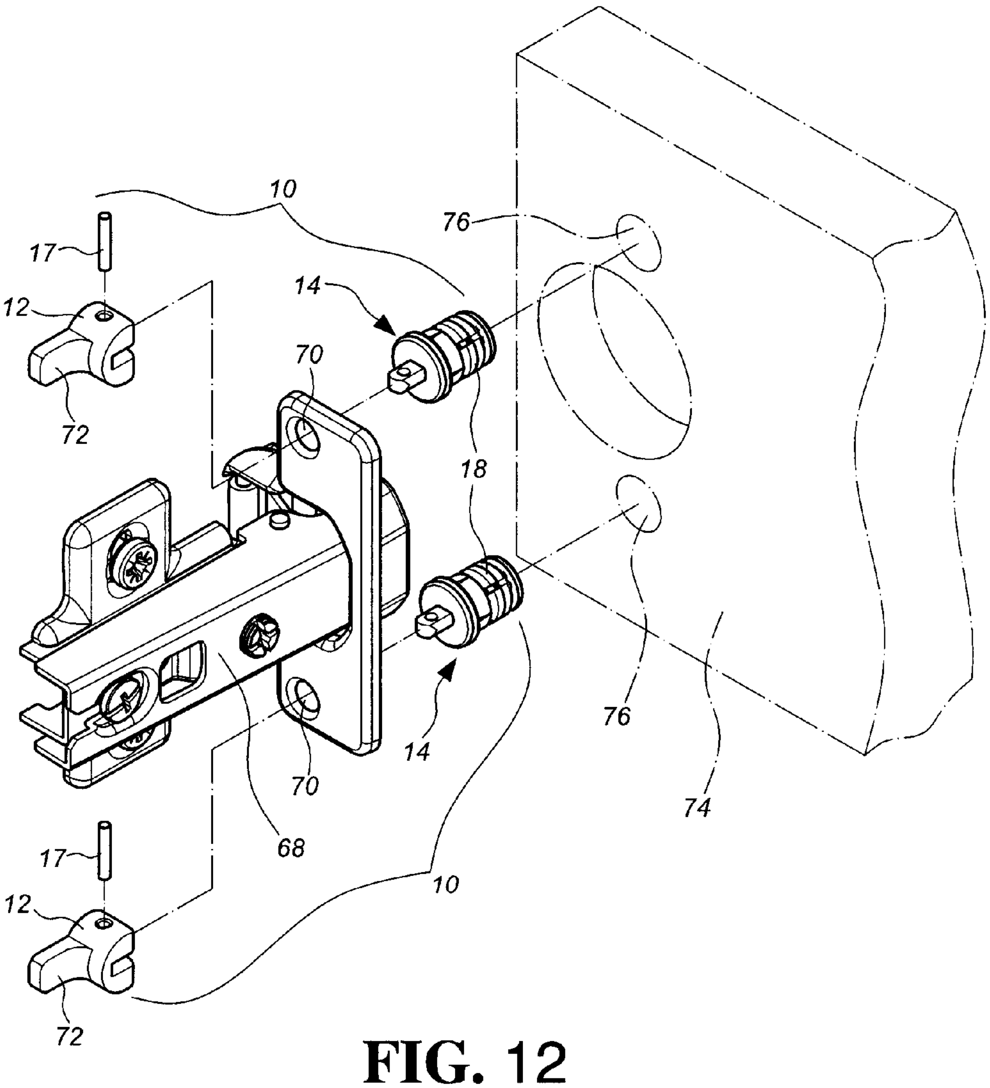
FIG. 12 is an exploded view of the present invention showing the connecting fitting applied to a door panel and a hinge.

Referring to FIG. 12, the connecting fitting is used to secure two objects, such as a hinge 68 and a door panel 74 which can be referred to as the first object and the second object, respectively. The hinge 68 comprises a pair of through holes 70 and a pair of inserting assemblies 14 which are inserted through the through holes 70 of the hinge 68 and pivotally connected to the body 12 with connecting members 17. The connecting portion of the body 12 comprises a handle 72. The door panel 74 has a pair of holes 76 for the corresponding inserting assemblies 14 to be inserted therein. When in use, the handle 72 of the body 12 is pulled to force the expandable members 18 of the inserting assemblies 14 to mesh with the holes 76 of the door panel 74.

In other words, when the inserting assembly is inserted into the hole of an object, by turning the body to an angle, the expandable member will be squeezed and the snap portions will be expanded to mesh with the inner wall of the hole of the object, thus, the expandable member is firmly secured to the object. To disengage the inserting assembly from the hole of the object, simply turn the handle back to its original position, the expandable member will no longer be expanded to mesh with the inner wall of the hole of the object. Accordingly, the connecting fitting of the present invention may be removed easily from the object.

Furthermore, the expandable member of the connecting fitting of the present invention is mounted between the inserting assembly and the body in a movable manner. Therefore, the expandable member can be disengaged and reused for many times. Whenever being used, the angle of the snap portions of the expandable member changes a bit to mesh with the inner wall, so that the mesh will be always secured. If necessary, the number of the expandable member can be increased.

Although this invention has been disclosed in the foresaid preferred embodiments, it is not the limitation of this invention. The scope of this invention is based on what we have claimed.

What is claimed is:

1. A connecting fitting, comprising:

a body having a cam surface thereon;

an inserting assembly comprising an inserting member, at least a pair of expandable members disposed in reverse relation one to another, and a plug insertable within an installation hole formed within an object;

said inserting member comprising a head portion and a body portion extending from said head portion, said body portion being pivotally connected to said body;

said pair of expandable members mounted between said body and said head portion of said inserting member, each of said expandable members comprising an expandable portion and a lip portion extending from said expandable portion, said expandable portions and said lip portions of each of said pair of expandable members cooperatively defining a compressible space therebetween, and each said expandable portion comprising a plurality of notches and snap portions; and said plug fitted on said body portion of said inserting member and located between said pair of expandable members and said body, wherein when said body is rotationally displaced, said expandable members are compressed between said plug and said head portion of said inserting member for radial displacement of said expandable members into engagement with an inner surface of said object formed by said hole.

2. The connecting fitting according to claim 1, wherein said body comprises a pair of lugs spaced from each other, a slot formed between said pair of lugs, and a connecting hole penetrating through said pair of lugs, said pair of lugs each having a first surface and a second surface, and said cam surface of said body being connected between said first and second surfaces.

3. The connecting fitting according to claim 1, wherein said body comprises a connecting portion.

4. The connecting fitting according to claim 1, wherein said body comprises a handle.

5. The connecting fitting according to claim 1, wherein said body comprises a connecting portion, a pair of lugs spaced from each other, a base disposed between said pair of lugs, and a pair of slots each formed between said base and one of said pair of lugs, and said inserting assembly being pivotally connected to each of the pair of slots.

6. A connecting fitting, comprising:

a body comprising a pair of lugs spaced from each other, a slot formed between said pair of lugs, and a connecting hole penetrating through said pair of lugs, said pair of lugs each having a first surface and a second surface, a first distance defined from the center of said connecting hole to said first surface, a second distance defined from the center of said connecting hole to said second surface, said first distance and said second distance being different;

an inserting assembly, said inserting assembly comprising an inserting member, at least a pair of expandable members disposed in reverse relation one to another, and a plug insertable within an installation hole formed within an object;

said inserting member comprising a head portion and a body portion extending from said head portion, said body portion being pivotally connected to said body;

said pair of expandable members mounted between said body and said head portion of said inserting member, each of said expandable members comprising an expandable portion and a lip portion extending from said expandable portion, said expandable portions and said lip portions of each of said pair of expandable members cooperatively defining a compressible space therebetween, each said expandable portion comprising a plurality of notches and snap portions; and said plug fitted on said body portion of said inserting member and located between said pair of expandable members and said body, wherein when said body is rotationally displaced, said expandable members are compressed between said plug and said head portion of said inserting member for radial displacement of said expandable members into engagement with an inner surface of said object formed by said hole.

7. The connecting fitting according to claim 6, wherein said body comprises a cam surface connected between said first surface and said second surface.

8. The connecting fitting according to claim 6, wherein said body comprises a connecting portion.

9. The connecting fitting according to claim 6, wherein said body comprises a handle.

10. The connecting fitting according to claim 6, wherein said body comprises a connecting portion, a pair of lugs spaced from each other, a base disposed between said pair of lugs, and a pair of slots each formed between said base and one of said pair of lugs, and said inserting assembly being pivotally connected to each of the pair of slots.

* * * * *